April 9, 1968 H. G. ROSEBERG 3,376,970
ARTICLE SEPARATING AND DISPENSING APPARATUS
Filed Aug. 4, 1966 2 Sheets-Sheet 1

INVENTOR.
HARRY G. ROSEBERG
BY
ATTORNEYS

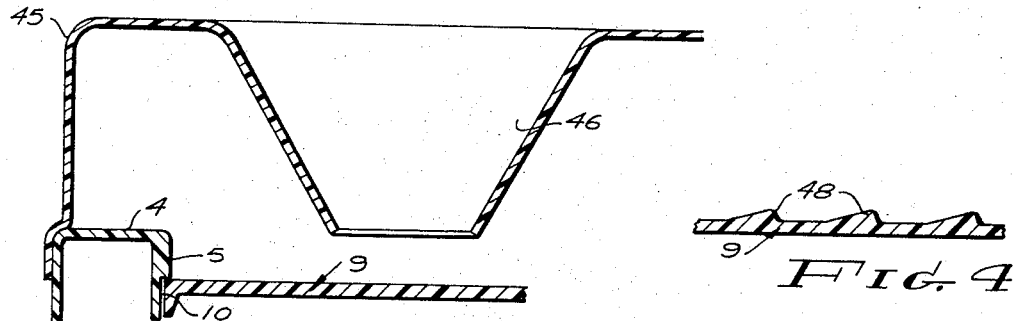
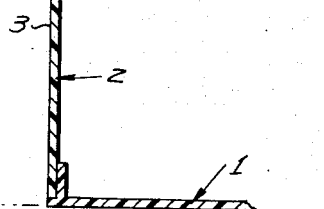
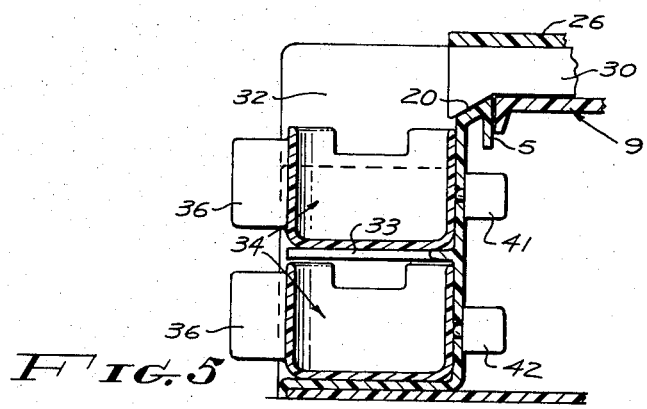
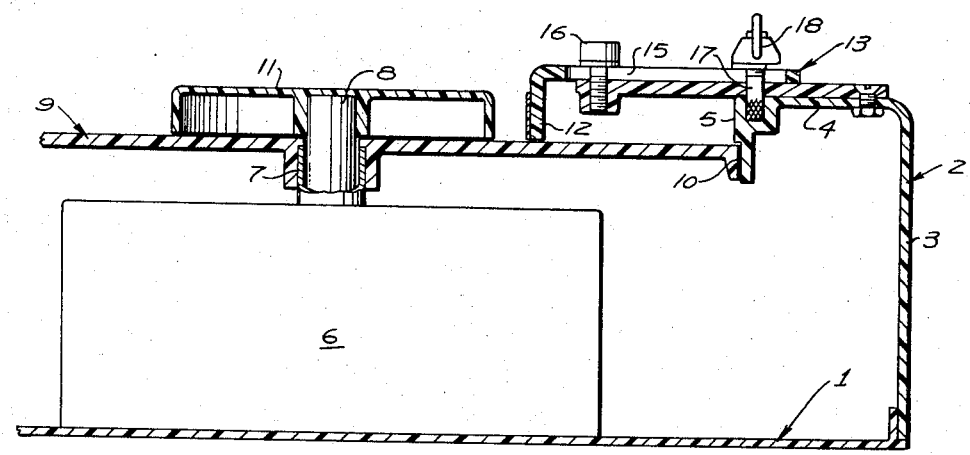

United States Patent Office 3,376,970
Patented Apr. 9, 1968

3,376,970
ARTICLE SEPARATING AND
DISPENSING APPARATUS
Harry G. Roseberg, 2011 S. Bedford St.,
Los Angeles, Calif. 90034
Filed Aug. 4, 1966, Ser. No. 570,207
11 Claims. (Cl. 198—40)

This invention relates to article separating and dispensing apparatus, and included in the objects of this invention are:

First, to provide a relatively inexpensive automatic apparatus which is particularly suitable for use by druggists for counting and dispensing pills, but which may be adapted to the counting and dispensing of many other articles large and small.

Second, to provide an apparatus wherein a quantity of articles are fed onto a rotating table and are first caused to align in single file, then are spaced substantially from each other before discharge from the apparatus.

Third, to provide an apparatus of this type which can be readily and quickly adjusted to accommodate articles of different size; for example, pills of different size.

With the above and other objects in view, as may appear hereinafter, reference is directed to the accompanying drawings in which:

FIGURE 3 is a fragmentary sectional view taken through 3—3 of FIGURE 1.

FIGURE 4 is a fragmentary sectional view taken through 4—4 of FIGURE 1.

FIGURE 5 is a fragmentary sectional view taken through 5—5 of FIGURE 1.

FIGURE 6 is a fragmentary sectional view taken through 6—6 of FIGURE 1.

FIGURE 7 is a fragmentary sectional view taken through 7—7 of FIGURE 1.

Figure 1:
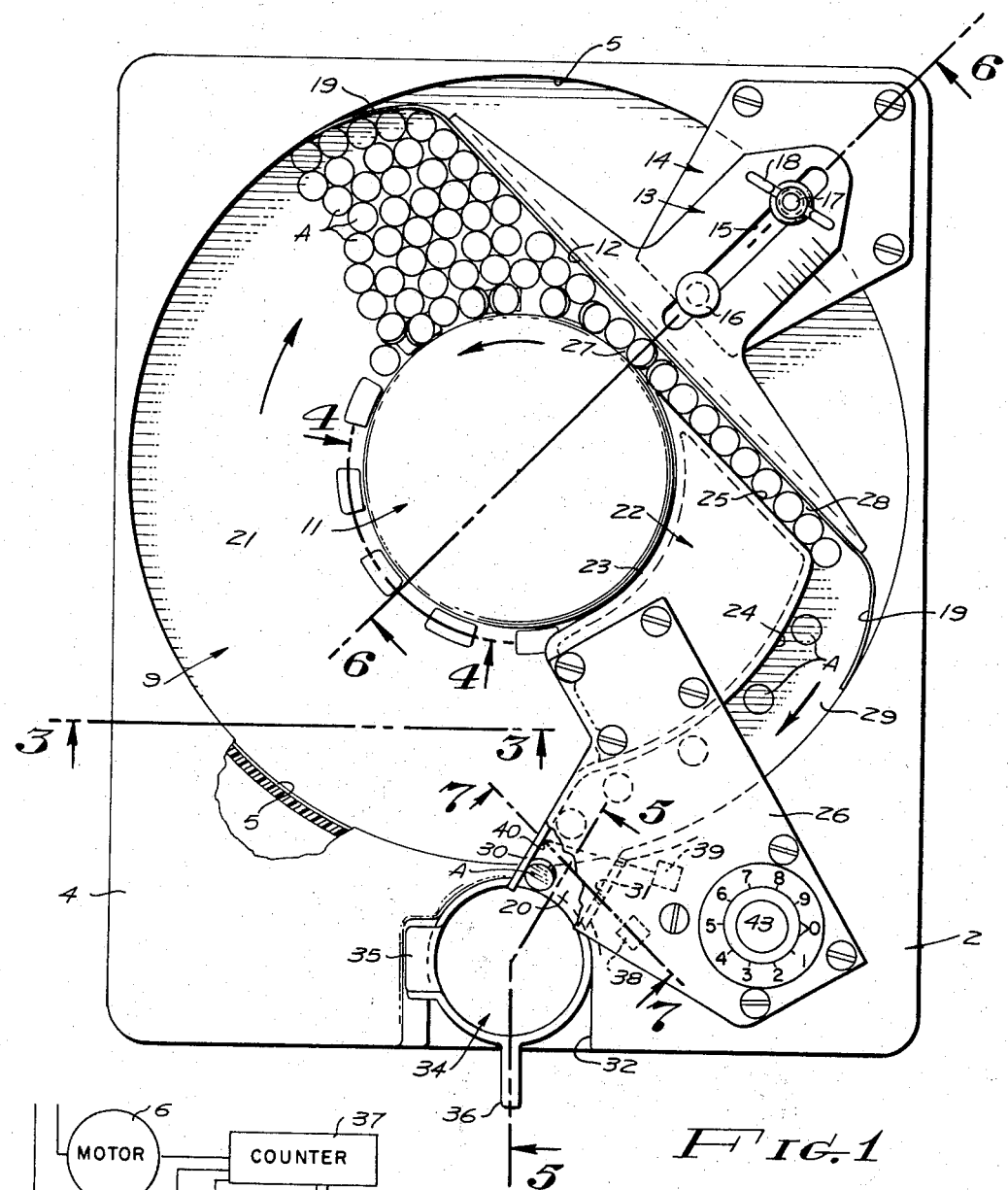
FIGURE 1 is a top or plan view of the apparatus for separating and dispensing articles.
Figure 2:
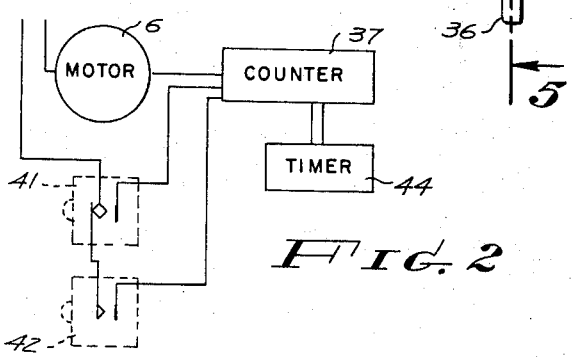
FIGURE 2 is a block diagram indicating the principal electrical components.

The article separating and dispensing apparatus includes a base plate 1 on which is mounted a housing 2, having side walls 3 and a top deck 4. The top deck is provided with a large circular opening defined by depending marginal walls 5.

Mounted on the base plate 1, in coaxial relation with the opening defined by the walls 5, is a motor 6 having an outer shaft 7 and an inner shaft 8. The outer shaft is arranged to rotate in a clockwise direction, as viewed in FIGURE 1, and the inner shaft is intended to rotate in a counter-clockwise direction and at a higher speed than the outer shaft.

Mounted on the outer shaft 7 is a turntable 9 which is recessed within the marginal walls 5. The lower portions of the marginal walls are preferably undercut, as indicated by 10, so that the portions of the marginal walls above the turntable overly its periphery.

Mounted on the inner shaft 8 is a counter-rotating disk 11. The side walls of the disk 11 and the walls 5 are vertical.

Extending across the turntable 9 is a transverse wall 12 formed at the end of a horizontal bracket 13. The bracket is directed toward one corner of the housing 2 and is supported on a mounting plate 14 secured to one corner of the top deck 4. The transverse wall 12 is radially adjustable by means of a slot 15 through which extends a guide pin 16 and bolt 17, the latter being provided with a wing nut 18. The lateral extremities of the transverse wall are provided with yieldable fingers 19, formed of a spring material, which curve away from the transverse wall and bear against opposite sides of the marginal wall 5.

At a point approximately one-third or one-fourth the distance between the extended ends of the fingers 19, the top deck 4 is interrupted by a chute 20, the upper edge of which is flush with or slightly below the surface of the turntable 9. The region between the chute 20, extending in a clockwise direction, and the left side of the transverse wall 12, as viewed in FIGURE 1, forms an article receiving area 21.

Mounted in the region between the chute 20 and the transverse wall 12, in a counter-clockwise direction, is a fixed wall forming member 22. The radially innerside 23 of the wall forming member 22 is located contiguous to the disk 11. The radially outer wall 24 of the member 22 is concentric with the marginal wall 5. A third wall 25, at the counterclockwise end of the member 22, is tangent to the disk 11 and parallel to the transverse wall 12. The wall forming member 22 is supported in a position to clear the turntable 9 by means of a mounting plate 26 secured to the top deck 4.

The transverse wall 12 defines with the disk 11 a single file slot 27. Similarly, the transverse wall 12 forms with the end wall 25, a single file chanel 28. The slot 27 and channel 28 may be adjusted in width by moving the transverse wall 12 in a radial direction.

The radially outer wall 24 of the member 22 and the confronting portion of the marginal wall 5 define therebetween an arcuate discharge channel 29 of approximately the same width as the maximum width to which the slot 27 and channel 28 may be adjusted. Extending from the extremity of the outer wall 24 is a deflector vane 30 which borders the chute 20 so as to guide articles from the turntable onto the chute. The housing is provided with a wall 31 bordering the chute 20 on the opposite side from the deflector vane 30.

The chute 20 discharges into a container recess 32 which extends the full depth of the housing 2 and is exposed to one of the side walls 3. At a mid-point, the recess 32 is provided with a supporting flange 33. The recess is adapted to receive a pair of containers 34, one of which rests on the flange 33 and the other of which fits under the flange. Each container is provided with a pouring lip 35 and a handle 36.

Mounted within the housing 2 is a counter 37 which may be conventional. The counter is preferably of the type which employs a photoelectric cell and a light source and functions in response to interruption of a beam of light between the light source and the photoelectric cell. In order to direct the beam of light, a pair of counter mirrors 38 and 39 are installed. The mirrors are so disposed that a beam of light may be directed against a reflecting surface 40, formed on the deflector vane 30, adjacent the chute 20. Perforations in the wall 31 permit passage of the beam of light between the mirrors.

Exposed to the container recess 32 is an upper switch 41 and a lower switch 42 which are engaged by containers inserted above or below the flange 33. The upper switch 41 is so arranged that upon insertion of a container above the flange, the motor 6 is activated and is later deactivated after the counter has operated a predetermined number of times. This may be determined by a dial 43 mounted on the top deck 4 or the mounting plate 26. As will be explained later, in the description of the operation of the apparatus, the lower switch 42 is closed when a container is absent from the region above the flange 33, providing a container is in the region below the flange. The lower switch also activates the motor 6, but bypasses the counter.

Connected with the counter is a timer 44 which is activated in the event that there is a predetermined delay in the pulses received by the counter for the purpose of shutting off the apparatus.

The top deck 4 is enclosed within a cover 45 having a top wall spaced above the top deck and provided with a funnel 46 for the discharge of articles onto the article receiving area 21.

Operation of the article separating and dispensing apparatus is as follows:

For purposes of illustration, the apparatus is shown as adjusted to handle pills or disk-like objects or articles designated A. It should be understood, however, that the apparatus is equally capable of handling cylindrical objects in the nature of capsules; and in either case, the operation of the apparatus is the same.

Operation is initiated by insertion of a container in the upper portion of the recess 32. Operation may also be initiated by a separate manual switch not shown. Before or after the turntable 9 and disk 11 are caused to rotate, a quantity of articles is poured through the funnel 46 onto the article receiving area 21. Movement of the turntable 9 in a clockwise direction causes the articles to crowd against the transverse wall 12 and would cause the articles to wedge into the slot 27 were it not for the counter rotation of the disk 11. As a result, the articles pass in single file through the slot 27 and into the channel 28.

At this point, it should be noted that prior to operation of the machine, the transverse wall 12 is adjusted so that a single article will pass freely through the slot 27 and channel 28, but the slot and channel will not accommodate a pair of articles in side by side relation. As a practical matter, a single adjustment of the transverse wall will accommodate a limited range of sizes of the article.

The articles are moved through the channel 28 by a rubbing action of the underlying turntable. The end wall 25 prevents the articles from moving at the same speed as the turntable. However, as each article approaches and moves beyond the outer wall 24, it rests freely on the turntable and thus moves at the same speed as the turntable. As a result, the articles separate a substantial distance from each other as they move along the discharge channel 29. While some slowing down of the articles occurs as they engage the deflector vane 30, substantial space still remains so that the articles do not interfere with the operation of the counter.

After the number of articles has been collected in the container, as determined by the setting of the dial 43, the motor is shut off. When the upper container and its contents are removed, the turntable is restarted and the excess articles are collected in the second container. During this operation there is no need to count the articles. In order that the apparatus will not run indefinitely, the counter may be utlized in conjunction with the timer 44, should there be too long an interval between counter pulses.

For some types of articles, it is desirable to agitate the ring of articles in contact with the disk 11. For this purpose, a ring of agitator lugs 48 may be provided.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:
1. A dispensing apparatus, comprising:
 (a) a turntable;
 (b) a marginal wall surrounding said turntable, said wall being interrupted by a discharge chute;
 (c) a counter rotating disk centered in said turntable;
 (d) a wall traversing and clearing said turntable between said marginal walls for rotation of said turntable thereunder, said traversing wall being disposed in confronting relation with said disk to define a slot for passing articles in single file; said turntable defining an article receiving area between said discharge chute and said traversing wall in the direction of rotation of said turntable whereby said articles are urged toward said single file slot; said counterrotating disk being operable to arrange said articles in single file for passage of said articles through said slot;
 (e) and means for accelerating, guiding and spacing said articles from said single file slot to said chute.

2. A dispensing apparatus, according to claim 1, wherein:
 (a) said transverse wall is radially adjustable to vary the width of said single file passage and yieldable fingers extend from the extremities of said transverse wall into contact with said marginal walls.

3. A dispensing apparatus, according to claim 1, wherein:
 (a) said turntable is provided with a ring of article agitation elements adjacent said disk.

4. A dispensing apparatus, according to claim 1, wherein said guide means includes:
 (a) a fixed wall member supported over and clearing said turntable for rotation of said turntable thereunder, said fixed wall member having a side tangent to said disk defining with said transverse wall a single file passage, and defining with said marginal walls an arcuate discharge passage between said transverse wall and said discharge chute; said articles being retarded in their movement through said single passage with respect to their movement through said discharge passage whereby the articles moving in said discharge passage are spaced from each other.

5. A dispensing apparatus according to claim 4, wherein:
 (a) means are provided adjacent said chute for counting said separated articles.

6. A dispensing apparatus, according to claim 5, wherein:
 (a) an article receiving container is removably disposed under said chute;
 (b) and a switch activated by placement of said upper container under said chute initiates operation of said turntable, and said counter terminates operation after a preselected number of articles have entered said container.

7. A dispensing apparatus according to claim 6, wherein:
 (a) a second article receiving container is removably disposed under the first article receiving container;
 (b) and said switch reactivates said turntable on removal of said first article receiving container thereby to discharge the excess articles into said second container.

8. A dispensing apparatus, comprising:
 (a) a housing structure having an opening in its upper side, a depending annular wall bordering and defining said opening, said wall being interrupted by a discharge chute;
 (b) a turntable recessed in said annular wall;
 (c) a rotatable disk disposed in concentric relation to said turntable;
 (d) means within said housing for rotating said turntable and said disk in opposite directions;
 (e) a transverse wall overlying said turntable and clearing the turntable to permit rotation of said turntable, said ends of the transverse wall terminating in contiguous relation to said annular wall, and said transverse wall defining with said disk a single file discharge slot for articles;
 (f) said turntable defining between said chute and said transverse wall in the direction of rotation, an article receiving area;
 (g) a cover for said housing having a funnel for the discharge of articles onto said turntable;
 (h) and a wall member overlying said turntable in the region beyond said article receiving area and clearing said turntable to permit rotation thereof, said wall member having a wall tangent to said disk and confronting said transverse wall to form a single file passage continuing from said single file solt, and a wall concentric with said annular wall forming an arcuate passage terminating at said chute;

(i) said articles being retarded while in said single file passage and accelerated as they enter said arcuate passage, thereby to separate said articles from each other.

9. A dispensing apparatus as set forth in claim 8, wherein:

(a) a mounting bracket extends radially over said turntable;
(b) said transverse wall is radially adjustable to vary the width of said single file slot and passage;
(c) and leaf spring fingers curve from said transverse wall to said annular wall.

10. A dispensing apparatus as set forth in claim 8, wherein:

(a) means are provided adjacent said chute for detecting and counting said separated articles;
(b) an article receiving container is removably disposed under said chute;
(c) and a switch activated by placement of said upper container under said chute initiates operation of said turntable, and said counter terminates operation after a preselected number of articles have entered said container.

11. A dispensing apparatus according to claim 10, wherein:

(a) a second article receiving container is removably disposed under the first article receiving container;
(b) and said switch reactivates said turntable on removal of said first article receiving container thereby to discharge the excess articles into said second container.

References Cited
UNITED STATES PATENTS

| | | | |
|---|---|---|---|
| 2,237,132 | 4/1941 | Christensen | 194—1.8 |
| 2,515,965 | 7/1950 | Nurnberg | 198—40 |

GERALD M. FORLENZA, *Primary Examiner.*

F. E. WERNER, *Assistant Examiner.*